(12) United States Patent
Goodman et al.

(10) Patent No.: US 9,556,850 B2
(45) Date of Patent: Jan. 31, 2017

(54) METHOD OF CONTROLLING A WIND TURBINE

(75) Inventors: Jenny Goodman, Guildford (GB); Kelvin Hales, Egham (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 793 days.

(21) Appl. No.: 13/880,029

(22) PCT Filed: Oct. 26, 2011

(86) PCT No.: PCT/DK2011/050408
§ 371 (c)(1),
(2), (4) Date: May 20, 2013

(87) PCT Pub. No.: WO2012/055419
PCT Pub. Date: May 3, 2012

(65) Prior Publication Data
US 2013/0280067 A1    Oct. 24, 2013

Related U.S. Application Data

(60) Provisional application No. 61/409,143, filed on Nov. 2, 2010.

(30) Foreign Application Priority Data

Oct. 27, 2010   (DK) .................................. 2010 70457

(51) Int. Cl.
*F03D 7/02* (2006.01)
*F03D 7/04* (2006.01)
*F03D 1/06* (2006.01)

(52) U.S. Cl.
CPC ........... *F03D 7/0232* (2013.01); *F03D 1/0658* (2013.01); *F03D 7/0224* (2013.01); *F03D 7/043* (2013.01); *Y02E 10/721* (2013.01); *Y02E 10/723* (2013.01)

(58) Field of Classification Search
CPC ...... B64C 27/57; B64C 27/72; B64C 27/7261; B64C 27/7266; B64C 27/7272; B64C 27/7277; B64C 27/7283; B64C 27/7288
See application file for complete search history.

(56) References Cited

U.S. PATENT DOCUMENTS

| 5,652,485 A | 7/1997 | Spiegel et al. |
| 8,475,127 B2 * | 7/2013 | Janker .................. B64C 27/615 416/1 |
| 2010/0215493 A1 | 8/2010 | Abdallah et al. |

FOREIGN PATENT DOCUMENTS

| GB | 2466200 A | 6/2010 |
| WO | 2009/056136 A2 | 5/2009 |
| WO | 2010/043647 A2 | 4/2010 |

OTHER PUBLICATIONS

International Search Report, PCT/DK2011/050408, Apr. 24, 2012.
(Continued)

*Primary Examiner* — Eric Keasel
*Assistant Examiner* — Jason Davis
(74) *Attorney, Agent, or Firm* — Patterson + Sheridan, LLP

(57) ABSTRACT

A method of controlling a wind turbine rotor blade, the blade comprising a pitch axis about which the blade can be pitched, and a flap movable to alter the aerodynamic profile of the blade, the method comprising the steps of: providing a pitch angle request (θ) to a pitch actuator; determining an initial flap angle request (β_flap); providing a decoupled flap angle request (β) to a flap actuator; herein the decoupled flap angle request (β) is calculated from the pitch angle request (θ) and the initial flap angle request (β_flap) such that the decoupled flap angle (β) provided to the flap actuator does not counteract the pitch angle request (θ); and pitching the (Continued)

blade according to the pitch angle request (θ) and moving the flap according to the decoupled flap angle request (β).

15 Claims, 4 Drawing Sheets

(56) References Cited

OTHER PUBLICATIONS

Search Report, Danish Patent & Trademark Office, Appln. PA 2010 70457, May 18, 2011.
Jelavic, M., Individual pitch control of wind turbine based on loads estimation, 978-1-4244-1766—Jul. 8, 2008 IEEE.
Barlas, T.K., Review of state of the art in smart rotor control research for wind turbines, Progress in Aerospace Sciences 46 (2010) I-27, Elsevier Ltd.

\* cited by examiner

METHOD OF CONTROLLING A WIND TURBINE

The present invention relates to a method of controlling a wind turbine rotor blade. In particular the present invention relates to a method of controlling a wind turbine rotor blade that is pitched about a pitch axis and has a movable flap.

Most modern wind turbines are controlled and regulated continuously during operation with the purpose of ensuring optimal performance of the wind turbines in all operating conditions, such as at different wind speeds or subject to different demands from the power grid.

A well-known and effective method of regulating the loads on the rotor is by pitching the blades about the longitudinal axis of each blade. However, as the blade lengths increase in size on modern wind turbines (which at present can be 60 meters or longer) pitching becomes a relatively slow regulation method, incapable of changing the blade positions fast enough to account for wind gusts, turbulence or other relatively fast load variations.

Another way of regulating the loads on the blades is by changing their aerodynamic surfaces or shapes over parts or the entire length of the blade, thereby increasing or decreasing the blade lift or drag correspondingly. Different means of changing the airfoil shape are known such as different types of movable or adjustable flaps (e.g. trailing edge flaps, leading edge slats or Krueger flaps).

The pitching of the blades is used typically to regulate the power output of the wind turbine and the flaps on the blades are used typically to regulate the loads on the blades. However, a problem exists in that the pitch control may counteract the flap control.

According a first aspect of the present invention there is provided a method of controlling a wind turbine rotor blade, the blade comprising a pitch axis about which the blade can be pitched, and a flap movable to alter the aerodynamic profile of the blade, the method comprising the steps of:
 providing a pitch angle request (θ) to a pitch actuator;
 determining an initial flap angle request (β_flap);
 providing a decoupled flap angle request (β) to a flap actuator; wherein
 the decoupled flap angle request (β) is calculated from the pitch angle request (θ) and the initial flap angle request (β_flap) such that the decoupled flap angle request (β) provided to the flap actuator does not counteract the pitch angle request (θ); and
 pitching the blade according to the pitch angle request (θ) and moving the flap according to the decoupled flap angle request (β).

The decoupling of blade pitch control from flap control is required so that the flap reference angles specified by a flap controller do not counteract the change in lift reference specified by a blade pitch controller.

This method of the present invention is advantageous because it only requires lookup tables to decouple the pitch request from the flap request and it is an open loop calculation. This results in reduced processing time and is more efficient.

The pitch angle request (θ) may be converted to a first parameter (ΔCL_θ) that represents a change in lift force at the location of the flap as a result of the rotor blade being pitched according to the pitch angle request (θ). The rotor blade may comprise a plurality of flaps spaced along the span of the blade, but the method requires the determination of the change in lift force at the spanwise location of the flap. As is well known in the field of aerodynamics, the lift coefficient at a section of blade is:

$$CL = L/0.5\rho Vr^2 A$$

Where L is the lift force acting on the blade section, ρ is the air density, Vr is the resultant wind velocity at the blade section and A is the planform area of the blade section that contains the flap. The change in lift force can be calculated by subtracted a new lift force from a previous lift force.

The pitch angle request (θ) may be converted to a change in pitch angle request (Δθ); and the first parameter (ΔCL_θ) is calculated as a function of the change in pitch angle request (Δθ) and known data of the rotor blade. The aerodynamics of a wind turbine rotor blade are typically designed through the use of wind tunnel testing and computational fluid dynamics (CFD) simulations. For each spanwise location on the blade, there is a known lift curve from the wind tunnel testing and/or CFD simulations that represents the lift versus the angle of attack of the blade. Using this known lift curve, the first parameter (ΔCL_θ) can be calculated.

The first parameter (ΔCL_θ) may be determined from a lookup table. In this instance, there is provided a look up table that contains pre-calculated values of the first parameter (ΔCL_θ) against the change in pitch angle request (Δθ).

The method may further comprise the step of: determining a second parameter (β_θ), wherein the second parameter (β_θ) represents the flap angle of the flap if the rotor blade is not pitched, that will provide a change in lift force at the location of the flap that is equivalent to the change in lift force (ΔCL_θ) as a result of the rotor blade being pitched according to the pitch angle request (θ). Preferably, in order to decouple the pitch angle request from the flap angle request, it is necessary to know what the flap angle of the flap would be that would achieve the change in lift force specified by the first parameter (ΔCL_θ) if the blade was not pitched.

The second parameter (β_θ) may be calculated as a function of the first parameter (ΔCL_θ) and known data of the rotor blade. In this instance, the second parameter (β_θ) is calculated from pre-calculated lift curves plotting angle of attack against lift force for multiple flap angles. This data can be stored in a lookup table.

The decoupled flap angle request (β) is calculated as a function of the initial flap angle request (β_flap) and the second parameter (β_θ). The decoupled flap angle request (β) may be calculated as the initial flap angle request (β_flap) plus the second parameter (β_θ) or the decoupled flap angle request (β) may be calculated as the second parameter (β_θ) minus the initial flap angle request (β_flap).

The pitch angle request (θ) may be converted to a third parameter (CL_θ) that represents the lift force at the location of the flap as a result of the rotor blade being pitched according to the pitch angle request (θ). The third parameter (CL_θ) is an absolute value of the lift force, rather than a change in lift force value.

The third parameter (CL_θ) may be determined from the angle of attack (α) of the blade at the location of the flap and known data of the rotor blade. The angle of attack may be known from a five hole pitot tube for example. Knowing the angle of attack at the flap location, the third parameter (CL_θ) can be calculated from a pre-calculated lift curve that can be stored in a lookup table.

The method may further comprise the step of: determining a second parameter (β_θ), wherein the second parameter (β_θ) represents the flap angle of the flap if the rotor blade is not pitched, that will provide a lift force at the location of the flap that is equivalent to the lift force (CL_θ) as a result of the rotor blade being pitched according to the pitch angle request (θ). Preferably, in order to decouple the pitch angle request from the flap angle request, it is necessary to know what the flap angle of the flap would be that would achieve the lift force specified by the third parameter (CL_θ) if the blade was not pitched.

The second parameter (β_θ) may be calculated as a function from the third parameter (CL_θ) and the angle of attack (α) of the blade at the location of the flap. In this instance, the second parameter (β_θ) is calculated from pre-calculated lift curves plotting angle of attack against lift force for multiple flap angles. This data can be stored in a lookup table.

The decoupled flap angle request (β) may be calculated as a function of the initial flap angle request (β_flap) and the second parameter (β_θ). The decoupled flap angle request (β) may be calculated as the initial flap angle request (β_flap) plus the second parameter (β_θ). The decoupled flap angle request (β) may be calculated as the second parameter (β_θ) minus the initial flap angle request (β_flap).

According to a second aspect of the present invention there is provided a wind turbine comprising:
 a rotor blade having a pitch axis and a flap movable to alter the aerodynamic profile of the blade;
 a pitch actuator for setting the pitch angle of the rotor blade;
 a flap actuator for moving the flap; and
 a controller configured to carry out the method of any one of the preceding claims.

The wind turbine may be a horizontal axis turbine with three blades of the type known as the "Danish Design".

The present invention will now be described in more detail, by way of example only, with reference to the accompanying drawings in which.

Figure 1:
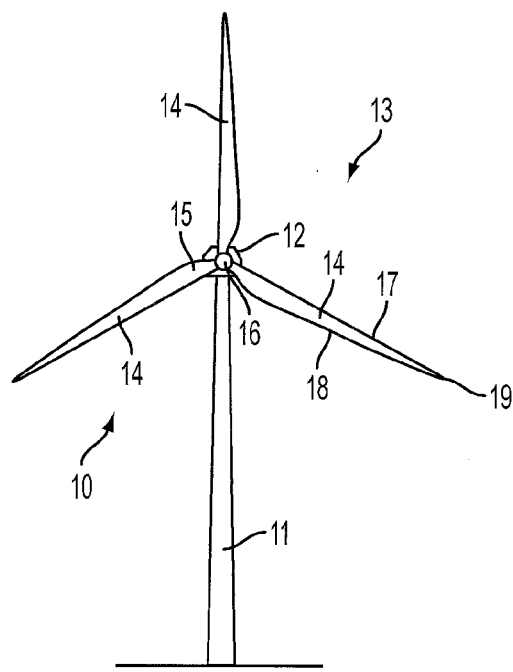
FIG. 1 is a view of a horizontal axis wind turbine.

FIG. 1 shows a horizontal axis wind turbine 10 according to the invention. The turbine comprises a tower 11 which supports a nacelle 12. The wind turbine 10 comprises a rotor 13 made up of three blades 14 each having a root end 15 mounted on a hub 16. Each blade 14 comprises a leading edge 17, a trailing edge 18, and a tip 19.

As is well known in the art, each blade 14 can pitch about its own pitch axis which extends longitudinally along the span of the blade. The blades 14 are typically set at a fixed pitch angle until a rated wind speed is reached. At wind speeds above the rated wind speed, the blades 14 are pitched out of the wind in order to regulate the power output of the wind turbine so that the rated power output of the wind turbine is not exceeded. The turbine's controller monitors the electrical power output of the turbine and if the power output is too high, the blades are pitched out of the wind. Conversely, the blades are pitched back into the wind whenever the wind drops again and the electrical power output drops.

Figure 2A:
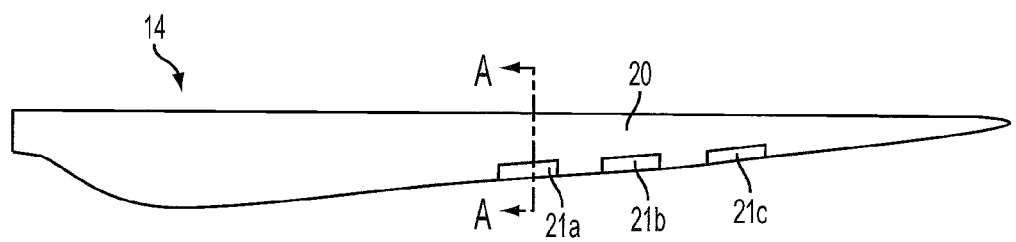
FIG. 2a is a plan view of a wind turbine blade.

FIG. 2a illustrates a blade 14 according to the invention. The blade 14 comprises a blade body 20 and three trailing edge flaps 21a, 21b and 21c (collectively referred to as 21) connected to the blade body and spaced along the span of the blade for modifying the aerodynamic surface or shape of the rotor blade. In use, when the turbine is generating power, the flaps 21 are actuated so that they deflect, in order to reduce the loads experienced by the wind turbine 1.

Figure 2B:
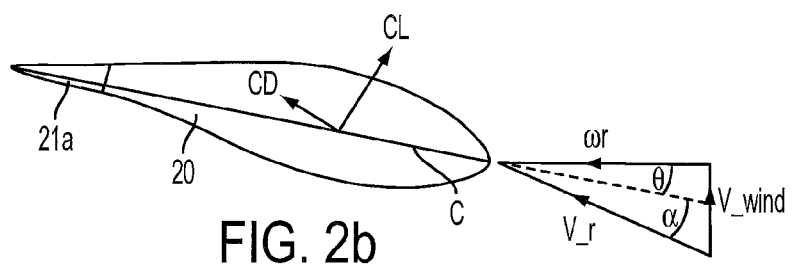
FIGS. 2b and 2c are cross sectional views of a wind turbine blade.

FIG. 2b is a cross section showing the blade profile along the line A-A in FIG. 2a. The resultant wind velocity V_r at the blade section is a combination of the free wind velocity V_wind and the rotational speed ωr of the blade 14 at that radial location. The resultant wind velocity V_r is at an angle to the chord c of the blade profile and this is the angle of attack α. The pitch angle θ is the angle between the chord c and the rotor plane (where the rotor plane is the rotational plane of the rotor which is normal to the rotational axis of the rotor). The pitch angle θ is set for the whole blade 14 by rotating the blade about its longitudinal axis. A lift coefficient for the blade section illustrated is defined as CL and a drag coefficient for the blade section is defined as CD where CL and CD are a dimensionless lift coefficient and drag coefficient respectively where:

$$CL=L/0.5\rho V\_r^2 A \text{ and } CD=D/0.5\rho V\_r^2 A$$

Where L is the lift force. D is the drag force, ρ is the air density, V_r is the resultant wind velocity at the blade section and A is the planform area of the blade section that contains the flap.

Figure 2C:
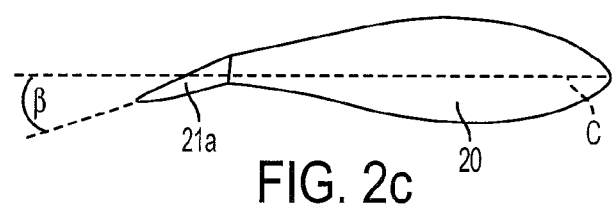

FIG. 2c is a cross section showing the blade profile along the line A-A in FIG. 2a showing the flap 21a deflected. As can be seen the flap is deflected an angle β relative to the chord line. Moving the flap to different angles changes the CL and CD at the blade section to alter the aerodynamic performance of the blade. Therefore, the aerodynamic loads experienced by the blade can be regulated by moving the flap 21 in order to smooth out fluctuations in the lift force, where the fluctuations may be caused by local wind conditions.

Although three trailing edge flaps 21 are shown, it should be appreciated that there may be fewer or more trailing edge flaps. For example, there may be a single trailing edge flap 21 per blade 14. The flaps are actuated by actuation means not shown, the actuation means may include electronic actuators, piezo-electric actuators or pneumatic actuators such as described in our co-pending patent application PCT/EP2009/063402.

Figure 3:
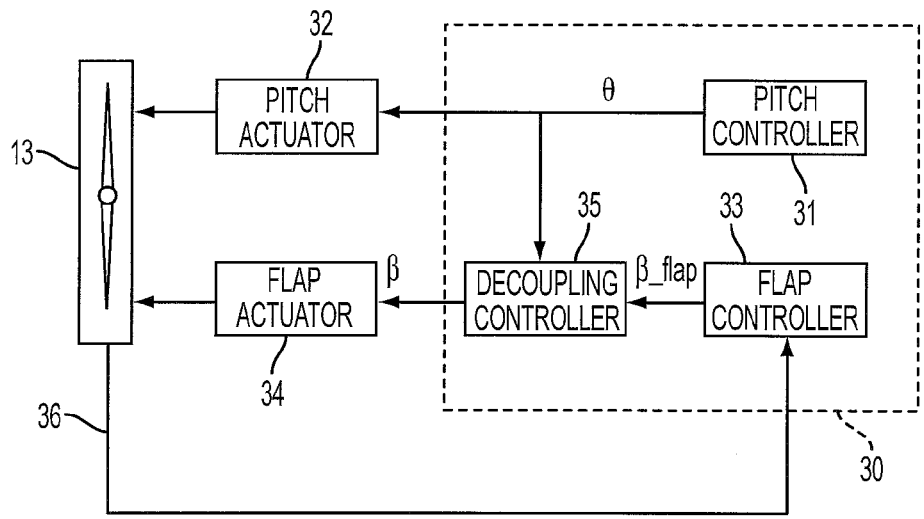
FIG. 3 shows a schematic of a controller according to the invention.

FIG. 3 shows a schematic of a controller 30 according to the invention. The controller 30 comprises a pitch controller 31 which receives an input such as the electrical power output of the turbine and/or the rotor rotational speed. The pitch controller 31 alters the pitch angle of the rotor blades 14 through a pitch actuator 32 which may be a hydraulic actuator or an electrical actuator. The pitch request from the pitch controller 31 is designated as θ.

A flap controller 33 takes as an input the flap bending moment from the blades 14 as indicated by line 36. Each blade 14 has a load sensor (not shown) mounted on the blade at the root end 15. In this example, the load sensor is a strain gauge that measures the blade flapwise bending moment. The "flapwise bending moment" of a blade is the moment when the blade deflects in a direction normal to the plane of the rotor and may be a result of turbulence or localised wind gusts. The flap controller 33 outputs a flap angle request for each individual flap that the flap controller calculates will keep the blade root bending moment constant. By keeping the blade root bending moment constant, the loads on the rotor that arise from turbulence for example are reduced. In addition, by keeping the blade root bending moment constant, extreme and fatigue loads on the rotor blades are reduced. The flap angle for each flap that the flap controller 33 calculates will keep the blade root bending moment constant is designated as β_flap. Although the flap bending moment is used in this instance, it is just one example of a flap control strategy. Other flap control strategies are possible, such as keeping the local lift coefficient at each flap location constant.

The pitch request θ is constant for the whole rotor blade 14, i.e. the entire blade is pitched to the angle θ. However, the flap angle is specific for each particular flap at each spanwise section of the blade 14. For the simplicity, the following only refers to a single flap request β_flap, but the skilled person will appreciate that there will be different flap angle request for each of the flaps 21 on the blade 14. In the following example, the spanwise location on the blade 14 where the flap angles are being calculated is referred to as the "flap location".

A flap actuator 34 sets the flap angle at the flap location. However, the angle β_flap is not provided directly to the flap actuator 34. A decoupling controller 35 takes as an input the pitch request θ and the flap request β_flap. The decoupling controller 35 which decouples the pitch control from the flap control is required so that the flap angles specified by the flap controller 33 do not counteract the changes specified by the pitch controller 31. The decoupling controller will be described in detail below with reference to FIG. 4a. The decoupling controller 35 outputs a flap angle that is decoupled from the pitch request angle θ, so that the flap angle does not counteract the pitch angle. The flap angle output from the decoupling controller 35, namely the flap angle that is decoupled from the pitch request θ, is designated as β. The decoupled flap angle β is the flap angle to be set at a particular flap. Therefore, other flaps at different spanwise positions along the blade 14 may have a different decoupled flap angle. The flap actuator 34 may be an electronic, mechanical or pneumatic actuator, for example.

Figure 4A:
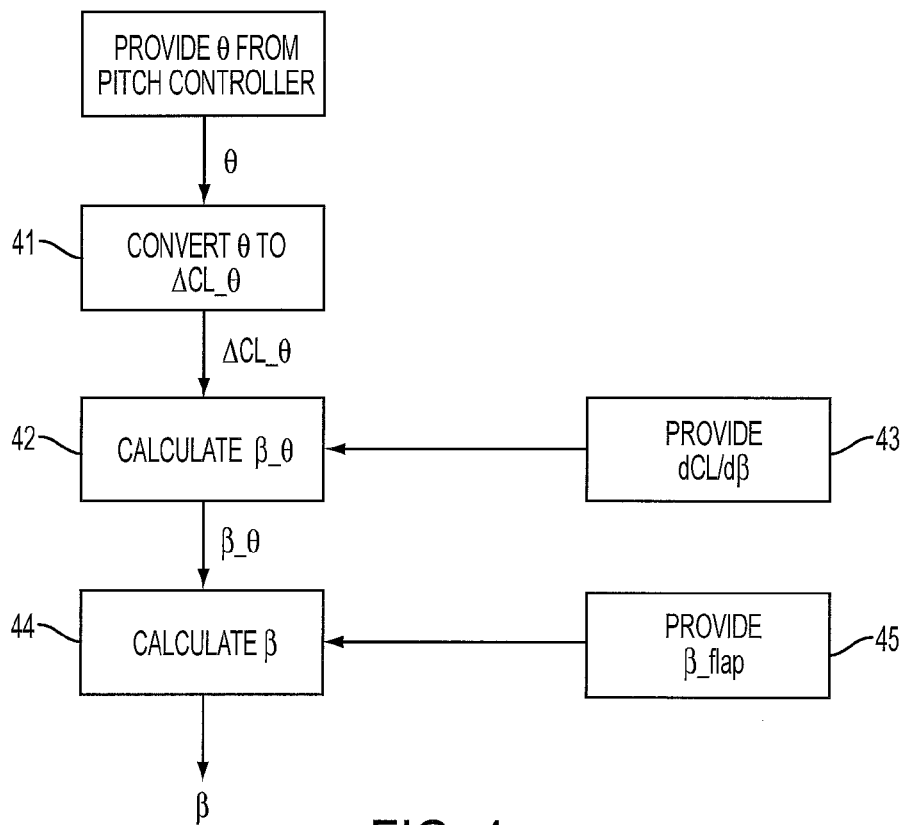
FIG. 4a is a first example of a method according to the invention.
Figure 4B:
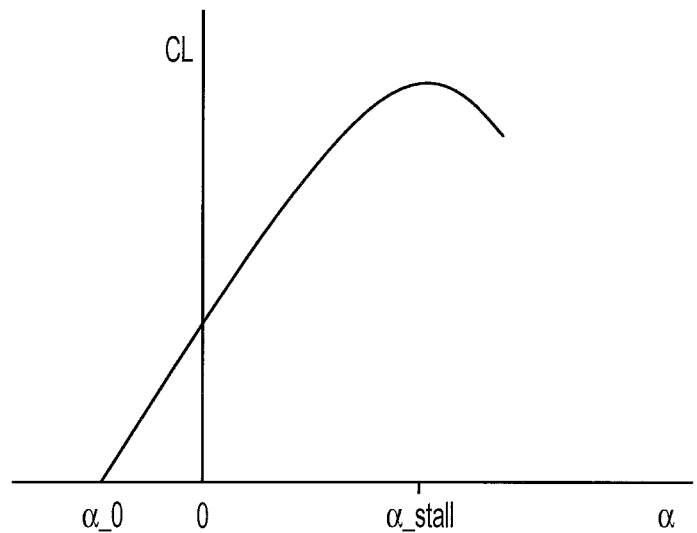
FIG. 4b shows a lift curve at a flap location.

FIG. 4a is a first example of the operational steps in the decoupling controller 35. The pitch angle request θ is provided from the pitch controller 31 to step 41 which converts the pitch angle request θ to a value (designated as ΔCL_θ) that represents the change in lift at the flap location as a result of the change in pitch angle. There are various ways this step can be carried out and only one is described at this point. However, further implementations of calculating ΔCL_θ are explained below with reference to FIG. 5. The pitch request θ is converted to a change in pitch request (designated as Δθ), simply by determining the change in pitch angle over a discrete time step, say 5 seconds. A lift curve plotting angle of attack of the incident wind (designated as α) against lift coefficient is known for the particular flap location in advance from wind tunnel studies or from computational fluid dynamics, for example as is well known to the skilled person. Such a lift curve for the flap location is shown in FIG. 4b. It is assumed that the blade is pitched such that the blade is operating in the linear part of the lift curve, that is below the α_stall angle. Although the angle of attack at the flap location is dependent on the incident wind velocity as can be seen from FIG. 2b, the wind velocity is not taken into account because it is assumed that the blade is operating on the linear part of the lift curve and the control step is only calculating a change in lift coefficient, rather than an absolute value. The linear part of the lift curve has a gradient designated as dCL/dα and the change in lift coefficient as a result of the change in pitch angle (ΔCL_θ) can be determined by substituting pitch angle (θ) for angle of attack (α) as it is assumed that the blade is operating in the linear part of the lift curve and therefore dCL/dα is not dependent on the incident wind velocity, i.e.:

$$\Delta CL\_\theta = \Delta\theta \times dCL/d\alpha$$

ΔCL_θ represents the change in lift coefficient requested by the pitch controller 31.

At step 42 the value β_θ is calculated. β_θ represents the flap angle at the flap location that will provide the same change in lift coefficient that the pitch controller is requesting, i.e. β_θ is the flap angle adjustment that decouples the pitch controller 31 from the flap controller 33. To calculate β_θ, the following formula is used, where dCL/dβ is stored in memory as indicated at 43.

$$\beta\_\theta = \Delta CL\_\theta / dCL/d\beta$$

Figure 4C:
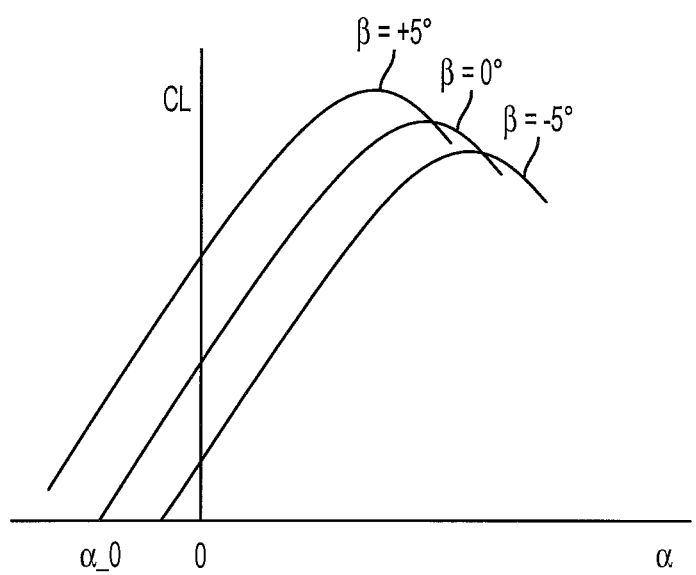
FIG. 4c shows a plurality of lift curves at a flap location for a plurality of flap angles.

The value dCL/dβ in this example is stored in memory 43 and it represents the change in lift coefficient against flap angle. In this example dCL/dβ assumed to be constant and is determined in advance before the turbine is in use, although other possibilities to provide values of dCL/dβ when it is not assumed to be constant are described below. FIG. 4c shows how dCL/dβ is determined in advance, in this example.

FIG. 4c is a graph showing lift curves against angle of attack for various flap angle settings (β=−5 degrees, 0 degrees, +5 degrees) and is known for the particular flap location in advance from wind tunnel studies or from computational fluid dynamics by placing the flap at different positions and measuring the lift coefficients. As described above, it is assumed in this first example that the blade 14 is operating in the linear section of the lift curve for all flap angles. As can be seen from FIG. 4c the lift curve for each flap angle has the same gradient in their linear regions. Therefore, the value dCL/dβ will be the same for each flap angle as well and this value can be determined from the graph in FIG. 4c.

Referring again to FIG. 4a, at step 44 the value of β, which is the final flap angle provided and which is the angle at which the flap is set, is calculated from β_θ and β_flap. β_flap is provided at 45 from the flap controller 33 and as described above with regard to FIG. 3, is the flap angle calculated by the flap controller 33 that will keep the blade root bending moment constant. The final flap angle, β, is calculated according to the function:

$$\beta = f(\beta\_\theta, \beta\_flap)$$

According to how the control method is set-up, the function f(β_θ, β_flap) may be β_θ+β_flap or β_θ−β_flap, for example.

Thus, the flap angle β is decoupled from the pitch angle θ so that the flap does not counteract the lift changes requested by the pitch controller 31. The control steps in FIG. 4a are carried out for each flap location on each blade 14. The pre-stored value dCL/dβ may be different for each flap location as the airfoil profile of the blade 14 will be different at each flap location.

The pitch/flap decoupling ensures that the flap angle demand from the flap controller 33 is adjusted so that it complements the pitch angle reference supplied by the pitch controller 33. The pitch controller angle reference is set to control the turbine in a required way, which could include rotor speed control, gust alleviation and power control amongst others. When the control method is performed above rated wind speed, rotor speed control is effectively also decoupled from the flap control. This is because the pitch angle is changed when above rated wind speed primarily to control the rotational speed of the rotor.

Figure 5:
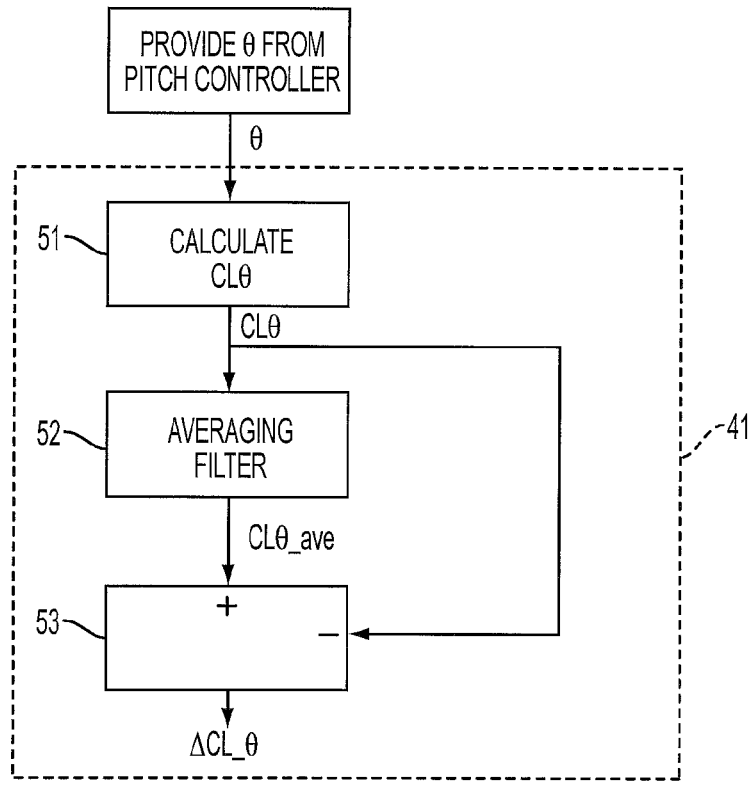
FIG. 5 shows an averaging filter according to the invention.

FIG. 5 shows another example of how the value $\Delta CL\_\theta$ can be calculated at step 41 by using an averaging filter. At step 51 the value $CL\theta$ is calculated. $CL\theta$ represents the lift at the flap location as a result of the pitch request. It should be noted that $CL\theta$ is not the actual lift coefficient at the flap location that is equivalent to the pitch angle because the angle of attack of the blade at the flap location has not been taken into account. However, $CL\theta$ is a representative value because it is assumed that the blade is operating on the linear part of the lift curve. The value $CL\theta$ is provided to step 52 which is an averaging filter which determines, in this example, the average of $CL\theta$ over the last five time steps, with each time step being 1 second. The output from the averaging filter is $CL\theta\_ave$ which represents the average lift coefficient requested by the pitch controller 31 over the last 5 seconds. To calculate $\Delta CL\_\theta$, the value $CL\theta$ is subtracted from $CL\theta\_ave$ at step 53 to find the change in lift coefficient requested by the pitch controller 31. In further implementations, the value $CL\theta$ can be obtained from lookup tables specific to each flap location.

FIGS. 4a and 4c described how the value $dCL/d\beta$ was calculated in advance and stored in memory where it is assumed to be a constant value at each flap location. However, if $dCL/d\beta$ is not constant with a change in angle of flap it is necessary to determine the angle of attack of the blade at the flap location and then retrieve the value of $dCL/d\beta$ from a lookup table which charts angle of attack against $dCL/d\beta$. Again, the value $dCL/d\beta$ for each angle of attack is provided in advance from wind tunnel studies or computational fluid dynamics. In operation, the angle of attack at the flap location may be determined from a five-hole pitot tube mounted at the leading edge at the flap location or other methods such as using the flap as a sensor.

Figure 6:
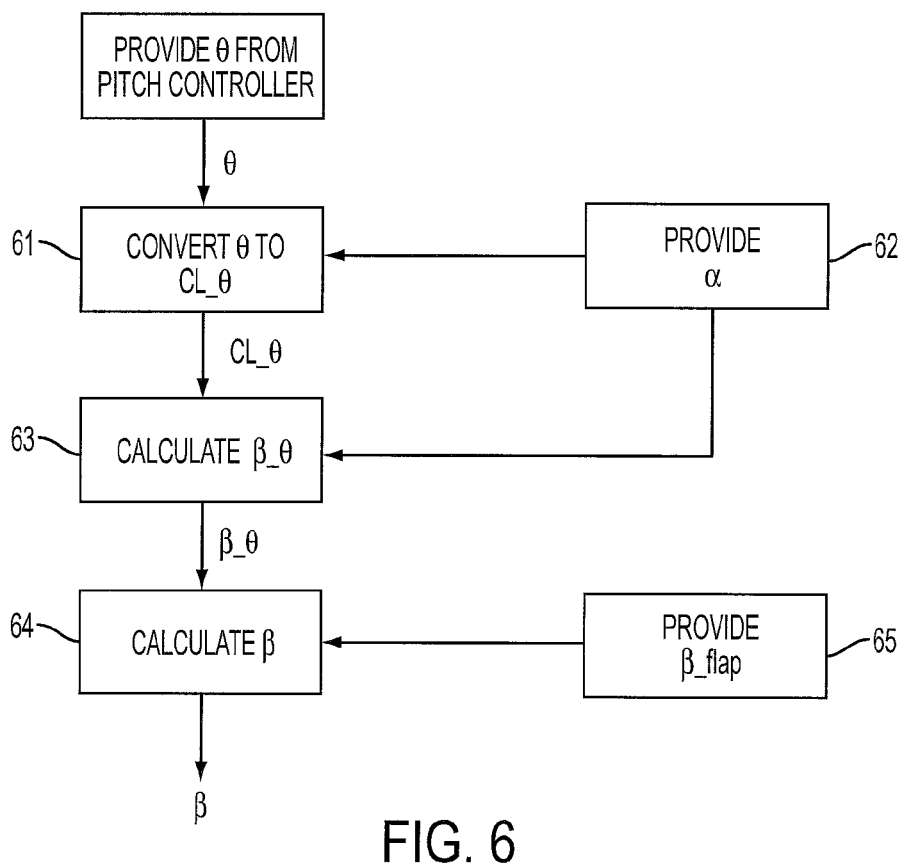
FIG. 6 is a second example of a method according to the invention.

The control steps described above with respect to FIG. 4a have been for incremental changes in the pitch angle, i.e. the decoupling controller 35 calculates the final flap angle using a change in pitch angle requested by the pitch controller 31. However, it is also possible to decouple the pitch control from the flap control by using absolute values of the pitch angle as described with reference to FIG. 6. At control step 61 the pitch request $\theta$ is converted to a lift coefficient $CL\_\theta$ which represents the actual lift coefficient for the flap location at the pitch request $\theta$ angle. The lift curve for the flap location, such as the one shown in FIG. 4b, is known in advance but to determine $CL\_\theta$, the decoupling controller 35 also needs to know the angle of attack $\alpha$ at the flap location. Therefore, $\alpha$ is provided at step 62 and may be determined by a five-hole pitot tube at the flap location, for example.

At step 63 a new flap angle is calculated for the flap at the flap location. This new flap angle is the flap angle that will produce the same lift value as $CL\_\theta$ if the blade was not pitched. This new flap angle is designated as $\beta\_\theta$ (which represents the same value as in FIG. 4a) and to determine it, the angle of attack $\alpha$ at the flap location with the blade pitched to the new position needs to be known. Referring to FIG. 4c, the angle of attack $\alpha$ is known and so a flap angle can be chosen which results in the lift value $CL\_\theta$ being achieved.

At step 64, the value of $\beta$, which is the final flap angle provided and which is the angle at which the flap is set at, is calculated from $\beta\_\theta$ and $\beta\_flap$ (which is provided at step 65 from the flap controller 33) in the same manner as is described with relation to FIG. 4a and step 44.

In a further example, the decoupling controller 35 should also take into account the torsion of the blade 14. When a blade 14 is pitched, the actual pitch angle at the flap locations may be different to the pitch set by the pitch controller 31. The amount of twist that a blade is experiencing at different wind speeds can be determined in advance of the turbine being erected and the values that each flap location is twisted at, relative to the pitch angle may be provided as a further input to the decoupling controller 35.

As has been described, the pitch controller 31 alters the pitch angle of the rotor blades 14 through a pitch actuator 32 with a pitch angle request $\theta$. In one example, the pitch request $\theta$ to all three blades is the same angle, i.e. all the blades are pitched at the pitch angle request $\theta$ simultaneously. In another example, cyclic pitch control is used where the pitch angle $\theta$ of the three blades is varied with a phase shift of 120° in the rotor plane in order to reduce loads caused by rotor tilt and yaw errors. In a further example, individual pitch control is used to adjust the pitch angle of each blade independently of the other blades.

The invention has been described with respect to keeping the blade root bending moment constant by adjusting the lift force at the flap locations to reduce variations in the blade flapwise forces. However, there are conditions when it is not suitable for the method to be operated so that the lift force at the flap locations is smoothed. For example, when the wind turbine reaches the cut-out wind speed (typically 25 m/s for a multi megawatt wind turbine) the blades are pitched in order to feather them out of the wind to stop power production—in this case, it would not be desirable to activate the flaps in order to keep the lift force approximately constant, instead the aim is to reduce the lift force to zero.

The invention claimed is:

1. A method of controlling a wind turbine rotor blade, the blade comprising a pitch axis about which the blade can be pitched, and a flap movable to alter the aerodynamic profile of the blade, the method comprising:
   providing a pitch angle request ($\theta$) to a pitch actuator, wherein the pitch angle request ($\theta$) is converted to a first parameter ($\Delta CL\_\theta$) that represents a change in lift force at the location of the flap as a result of the rotor blade being pitched according to the pitch angle request ($\theta$);
   determining an initial flap angle request ($\beta\_flap$);
   providing a decoupled flap angle request ($\beta$) to a flap actuator; wherein
   the decoupled flap angle request ($\beta$) is calculated from the pitch angle request ($\theta$) and the initial flap angle request ($\beta\_flap$) such that the decoupled flap angle request ($\beta$) provided to the flap actuator does not counteract the pitch angle request ($\theta$);
   determining a second parameter ($\beta\_\theta$), wherein the second parameter ($\beta\_\theta$) represents the flap angle of the flap if the rotor blade is not pitched ($\theta=0$), that will provide a change in lift force at the location of the flap that is equivalent to the change in lift force ($\Delta CL\_\theta$) as a result of the rotor blade being pitched according to the pitch angle request ($\theta$); and
   pitching the blade according to the pitch angle request ($\theta$) and moving the flap according to the decoupled flap angle request ($\beta$).

2. A method according to claim 1, wherein the pitch angle request ($\theta$) is converted to a change in pitch angle request ($\Delta\theta$); and
   the first parameter ($\Delta CL\_\theta$) is calculated as a function of the change in pitch angle request ($\Delta\theta$) and known data of the rotor blade.

3. A method according to claim 1, wherein the first parameter ($\Delta CL\_\theta$) is determined from a lookup table.

4. A method according to claim 1, wherein the second parameter ($\beta\_\theta$) is calculated as a function of the first parameter ($\Delta CL\_\theta$) and known data of the rotor blade.

5. A method according to claim 1, wherein the decoupled flap angle request ($\beta$) is calculated as a function of the initial flap angle request ($\beta\_flap$) and the second parameter ($\beta\_\theta$).

6. A method according to claim 5, wherein the decoupled flap angle request ($\beta$) is calculated as the initial flap angle request ($\beta\_flap$) plus the second parameter ($\beta\_\theta$).

7. A method according to claim 5, wherein the decoupled flap angle request ($\beta$) is calculated as the second parameter ($\beta\_\theta$) minus the initial flap angle request (($\beta\_flap$).

8. A method according to claim 1, wherein the pitch angle request ($\theta$) is converted to a third parameter ($CL\_\theta$) that represents the lift force at the location of the flap as a result of the rotor blade being pitched according to the pitch angle request ($\theta$).

9. A method according to claim 8, wherein the third parameter ($CL\_\theta$) is determined from an angle of attack ($\alpha$) of the blade at the location of the flap and known data of the rotor blade.

10. A method according to claim 8, further comprising: determining a fourth parameter ($\beta\_\theta$), wherein
the fourth parameter ($\beta\_\theta$) represents the flap angle of the flap if the rotor blade is not pitched, that will provide a lift force at the location of the flap that is equivalent to the lift force ($CL\_\theta$) as a result of the rotor blade being pitched according to the pitch angle request ($\theta$).

11. A method according to claim 10, wherein the fourth parameter ($\beta\_\theta$) is calculated as a function from the third parameter ($CL\_\theta$) and the angle of attack ($\alpha$) of the blade at the location of the flap.

12. A method according to claim 11, wherein the decoupled flap angle request ($\beta$) is calculated as a function of the initial flap angle request ($\beta\_flap$) and the fourth parameter ($\beta\_\theta$).

13. A method according to claim 12, wherein the decoupled flap angle request ($\beta$) is calculated as the initial flap angle request ($\beta\_flap$) plus the fourth parameter ($\beta\_\theta$).

14. A method according to claim 13, wherein the decoupled flap angle request ($\beta$) is calculated as the fourth parameter ($\beta\_\theta$) minus the initial flap angle request ($\beta\_flap$).

15. A wind turbine comprising:
a rotor blade having a pitch axis and a flap movable to alter the aerodynamic profile of the blade;
a pitch actuator for setting a pitch angle of the rotor blade;
a flap actuator for moving the flap; and
a controller configured to:
provide a pitch angle request ($\theta$) to the pitch actuator, wherein the pitch angle request ($\theta$) is converted to a first parameter ($\Delta CL\_0$) that represents a change in lift force at the location of the flap as a result of the rotor blade being pitched according to the pitch angle request ($\theta$);
determine an initial flap angle request ($\beta\_flap$);
provide a decoupled flap angle request ($\beta$) to the flap actuator; wherein the decoupled flap angle request ($\beta$) is calculated from the pitch angle request ($\theta$) and the initial flap angle request ($\beta\_flap$) such that the decoupled flap angle request ($\beta$) provided to the flap actuator does not counteract the pitch angle request ($\theta$);
determine a second parameter ($\beta\_\theta$), wherein the second parameter ($\beta\_\theta$) represents the flap angle of the flap if the rotor blade is not pitched ($\theta=0$), that will provide a change in lift force at the location of the flap that is equivalent to the change in lift force ($\Delta CL\_0$) as a result of the rotor blade being pitched according to the pitch angle request ($\theta$); and
pitch the blade according to the pitch angle request ($\theta$) and moving the flap according to the decoupled flap angle request ($\beta$).

* * * * *